United States Patent
Shieh

(10) Patent No.: US 7,281,264 B2
(45) Date of Patent: Oct. 9, 2007

(54) SECURITY SYSTEM AND METHOD FOR PNP DEVICE COUPLED TO NETWORK CLIENT

(75) Inventor: Horng-Ji Shieh, Taipei Hsien (TW)

(73) Assignee: Acer Inc., Taipei Hsien (TW)

( * ) Notice: Subject to any disclaimer, the term of this patent is extended or adjusted under 35 U.S.C. 154(b) by 777 days.

(21) Appl. No.: 10/429,124

(22) Filed: May 2, 2003

(65) Prior Publication Data

US 2004/0139343 A1 Jul. 15, 2004

(30) Foreign Application Priority Data

Jan. 10, 2003 (TW) .............................. 92100491 A

(51) Int. Cl.
G06F 21/04 (2006.01)
G06F 3/00 (2006.01)
H04L 9/00 (2006.01)
(52) U.S. Cl. .............................. 726/3; 726/34; 710/36; 710/200
(58) Field of Classification Search ...................... None
See application file for complete search history.

(56) References Cited

U.S. PATENT DOCUMENTS

| 5,911,042 | A | * | 6/1999 | Kugue | ........................ | 726/19 |
|---|---|---|---|---|---|---|
| H1944 | H | * | 2/2001 | Cheswick et al. | .......... | 713/201 |
| 6,311,276 | B1 | * | 10/2001 | Connery et al. | ................ | 726/2 |
| 6,421,782 | B1 | * | 7/2002 | Yanagisawa et al. | .......... | 726/4 |
| 6,425,040 | B1 | * | 7/2002 | Dewa et al. | ................. | 710/303 |
| 6,463,540 | B1 | * | 10/2002 | Lelong et al. | ................ | 726/17 |
| 6,493,824 | B1 | * | 12/2002 | Novoa et al. | ................ | 713/162 |
| 6,526,507 | B1 | * | 2/2003 | Cromer et al. | .............. | 713/162 |
| 6,591,368 | B1 | * | 7/2003 | Ryu | ........................... | 713/323 |
| 6,606,709 | B1 | * | 8/2003 | Connery et al. | .............. | 726/14 |
| 6,823,463 | B1 | * | 11/2004 | Challener et al. | .............. | 726/5 |
| 6,832,317 | B1 | * | 12/2004 | Strongin et al. | ............ | 713/182 |
| 6,883,043 | B2 | * | 4/2005 | Horiguchi | ..................... | 710/37 |
| 6,912,663 | B1 | * | 6/2005 | Dayan et al. | ................. | 726/16 |
| 7,028,133 | B1 | * | 4/2006 | Jackson | ...................... | 710/313 |
| 7,043,575 | B2 | * | 5/2006 | Stephan | ...................... | 710/36 |
| 7,133,296 | B2 | * | 11/2006 | Choi et al. | .................. | 361/798 |
| 2005/0149629 | A1 | * | 7/2005 | Kidd et al. | ................. | 709/224 |

* cited by examiner

Primary Examiner—Christopher Revak
(74) Attorney, Agent, or Firm—Ladas & Parry LLP

(57) ABSTRACT

A security system and method for a plug-and-play (PnP). The security system includes a server, a network system and a client. The server distributes a monitor program on the client via a remote control agent in advance, and transmits a lock or unlock message to the client through the network system. The client receives the message from the server, and locks or unlocks the PnP device by the monitor program via a disk I/O API.

17 Claims, 5 Drawing Sheets

SECURITY SYSTEM AND METHOD FOR PNP DEVICE COUPLED TO NETWORK CLIENT

BACKGROUND OF THE INVENTION

1. Field of the Invention

The present invention relates to a security system and method for a PnP (Plug and Play) device, and particularly to a security system and method that locks and/or unlocks at least one PnP device coupled to a network client through a network system.

2. Description of the Related Art

With the convenience of movable media, the data storage, backup and transport of computer information can be easily accomplished. However, the computer information that should be kept confidential can be easily leaked out by an unsecured movable medium.

Currently, the most popular movable medium is a storage device that adopts USB (Universal Serial Bus) as a communication interface. The write-protection capability of a USB storage device is performed in a hardware manner, for example, the switch of a USB storage device can be manipulated to protect the USB storage device from being written. However, users can also disable the write protection capability of a USB storage device by the switch. The way of protecting the USB storage device from being written in a hardware manner is not a reliable solution, and there is no guarantee for the secrecy of the computer information.

U.S. Pat. No. 6,463,540 discloses a securing method for computer bus devices, such as USB devices. FIG. 1 shows a diagram of the structure of a computer with a peripheral device according to the U.S. Pat. No. 6,463,540. As shown in FIG. 1, the entire computer system includes a computer 10 and a peripheral device 20. The computer 10 comprises a bus 11 to connect the peripheral device 20, and a filter driver 12 to transmit the owner identification recorded in the computer 10 to the peripheral device 20 on the bus 11.

The peripheral device 20 comprises a connection means 21 to connect the peripheral device 20 to the bus 11, a storage 22 to store the identity of the owner of the peripheral device 20, a state storage 23 to store the information representative of the locked or unlocked state of the peripheral device 20, and a memory 24 to store the information received on the bus 11 from the computer 10. The peripheral device 20 also comprises a CPU 25 acting as a comparator to compare the identity stored in the storage 22 and the owner identification received from the computer 10. If the identity of the peripheral device 20 conforms to the owner identification of the computer 10 and the state of the device 20 is unlock, the device 20 can be accessed by the computer 10.

However, in the U.S. Pat. No. 6,463,540, the peripheral device has to store the owner information and the state information thereof, and it must set up an additional processor to carry out the corresponding comparison procedures. In addition, the purpose of the conventional security method is to protect the information stored in a peripheral device instead of securing the computer information from illegitimate access. Therefore, the security of computer information between the computer and peripheral devices is still a major task to be reformed.

SUMMARY OF THE INVENTION

It is therefore an object of the present invention to provide a security system and method that locks and/or unlocks at least one PnP device coupled to a network client through a network system.

To achieve the above object, the present invention provides a security system for a PnP device coupled to a network client. The system includes a server, a network system and a client. The server distributes a monitor program in advance on the network client via a remote control agent, and transmits a lock/unlock message to the network client through the network system. The network client receives the lock/unlock message from the server, and in response thereto locks or unlocks the PnP device by the monitor program via a disk I/O (Input/Output) API (Application Programming Interface).

A security method for at least one PnP device coupled to a network client which is completed through the use of the security system according to present invention is provided. First, the server transmits a lock or unlock message. Then, the network client receives the lock/unlock message from the server through the network system, and in response thereto lock or unlock the PnP device coupled thereto by a monitor program via a disk I/O API.

Further, the monitor program updates a lock flag if the lock/unlock message is received. If a new PnP device is installed on the client, the monitor program checks whether the new PnP device matches to a lock target. If so, the monitor program checks the lock flag and locks the new PnP device according to the state of the lock flag.

If the PnP device is removed from the client, the monitor program checks whether the PnP device is a locked device. If so, the monitor program unlocks a connection port used to connect to the PnP device via the disk I/O API. When the network client is rebooted, the monitor program checks the lock flag and lock/unlock the PnP device according to the lock flag.

BRIEF DESCRIPTION OF THE DRAWINGS

The aforementioned objects, features and advantages of the present invention will become apparent by referring to the following detailed description of the preferred embodiment with reference to the accompanying drawings, wherein.

DETAILED DESCRIPTION OF THE INVENTION

Figure 1:
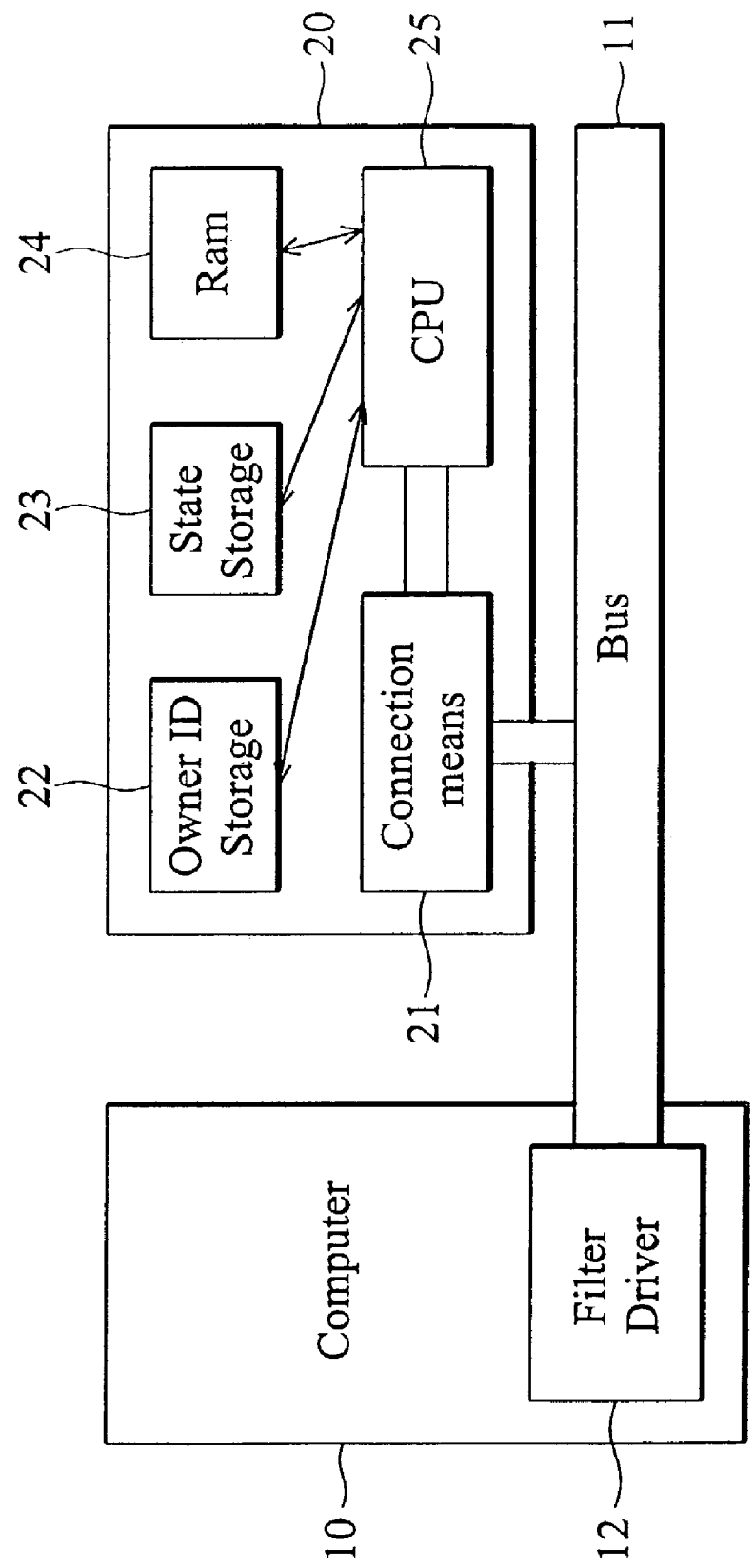
FIG. 1 shows a diagram of the structure of a computer with a peripheral device according to U.S. Pat. No. 6,463,540.
Figure 2:
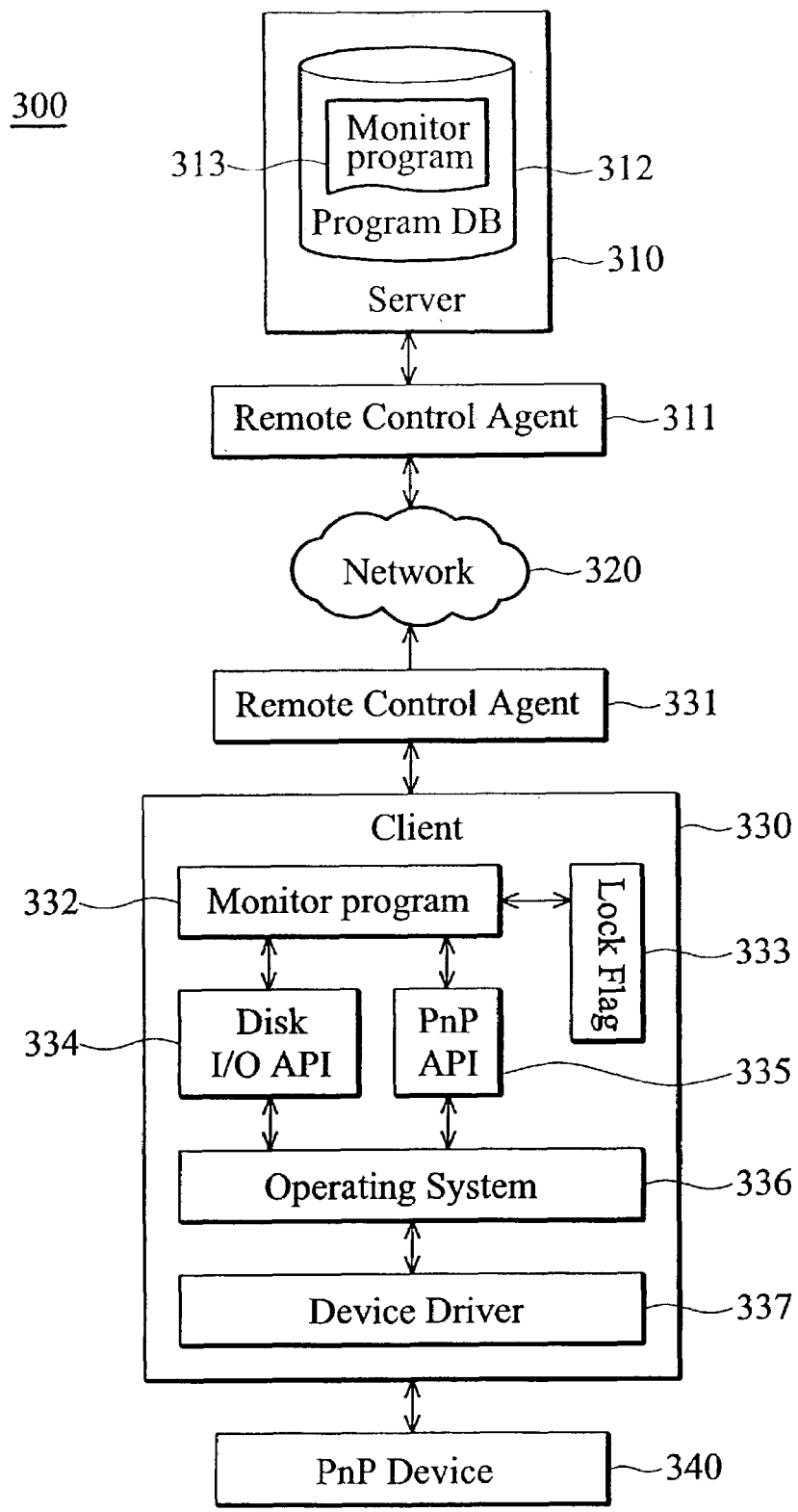
FIG. 2 is a schematic diagram illustrating the architecture of the security system for a PnP according to one embodiment of the present invention.

FIG. 2 illustrates the architecture of the security system for a PnP device according to one embodiment of the present invention. The system 300 according to the embodiment of the present invention includes a server 310, a network system 320, a network client 330 and a PnP device 340. Note that the server can control and manage several network clients through the network system 320, although only one network client is shown in this embodiment.

The server 310 includes a program database 312 to store a monitor program 313. The server 310 can be configured with a remote control agent 311, such as the LDCM (LanDesk Client Manager) program of Intel Corp being installed thereon. The server 310 distributes the monitor program 313 stored in the program database 312 on the network client 330 via the remote control agent 311 through the network system 320. It should be noted that the server 310 can distributes the monitor program 313 on the network client 330 in advance, such that the monitor program 313 can be a resident program in the network client 330 to perform related security processes on the client 330. The detailed operation of the monitor program 313 is discussed later.

The network 320 can be an intranet, cable network, wireless network, or Internet.

Similarly, the client 330 can be also configured with a remote control agent 331 being installed thereon that is corresponding to the remote control agent 311 on the server 310 to receive instructions from the server 310. The network client 330 includes the monitor program 332 distributed by the server 310, a lock flag 333, a disk I/O API 334, a PnP API 335, an operating system 336, and a device driver 337.

The monitor program 332 includes a lock target table (not shown in figure) to record the type of PnP device to be protected (locked), and a locked device table (not shown in figure) to record the locked PnP devices coupled to the client 330. In addition, the lock flag 333 can be a registry to record the lock state, such as "Lock" or "Unlock", corresponding to each or all of the PnP devices.

The disk I/O API 334 can acquire the type of PnP device 340, the assigned disk ID number, and the related information via the operating system 336, and instruct the network client 330 to lock or unlock the PnP device 340 in the Disk I/O level. The PnP API 335 can be notified of the PnP device 340 being removed from the network client 330 or a new PnP device being installed on the client 330 by the operating system 336. The device driver 337 allows the network client 330 to operate the PnP device 340. The PnP device 340 may be a floppy disk, a USB handy drive, a USB hard disk (HD), an IEEE (Institute of Electrical and Electronic Engineers) 1394 HD, a COM port HD, a CD-RW, or the like.

Figure 3:
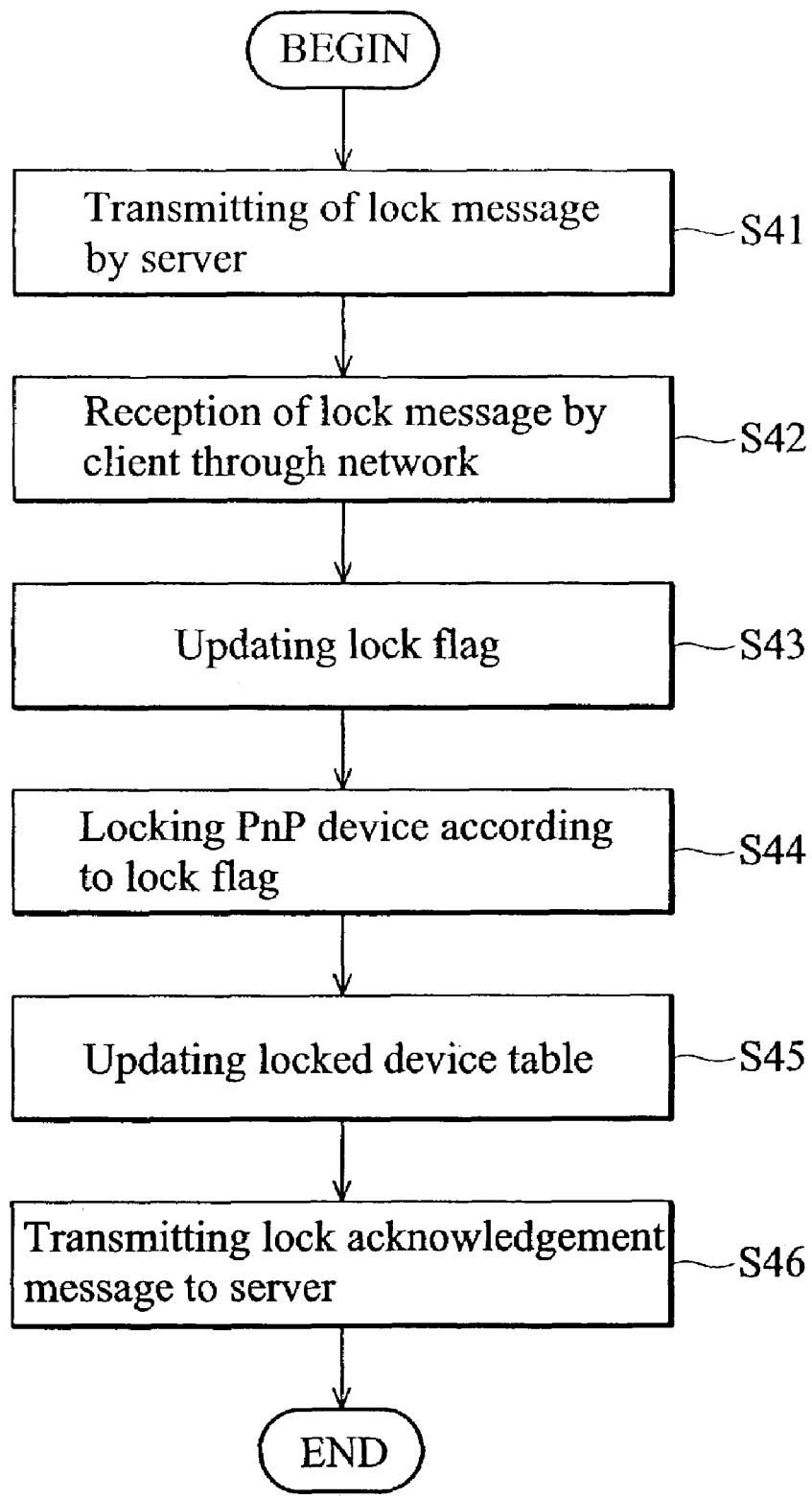
FIG. 3 is a flowchart showing the lock process of at least one PnP device coupled to a network client according to one embodiment of the present invention.

FIG. 3 shows the lock process of at least one PnP device coupled to a network client according to one embodiment of the present invention.

First, in step S41, the server 310 transmits a lock message. The lock message may include a client ID and an indication of which PnP devices is to be locked, such that the designated client and the PnP device needed to be protected can be recognized. Note that all PnP devices on the designated client will be locked if the lock message only includes the client ID.

Then, in step S42, the client 330 receives the lock message from the server 310 through the network system 320. Thereafter, in step S43, the client 330 updates the state of the lock flag 333 as "Lock" by the monitor program 332. It should be noted that the lock flag 333 may record the lock state, such as "Lock" or "Unlock" corresponding to each or all of the PnP devices. Afterward, in step S44, the client 330 locks the PnP device 340 by the monitor program 332 via the disk I/O API 334 according to the received lock message, and in step S45, the monitor program 332 updates the locked device table, that is, to add the PnP device 340 to the locked device table. Finally, in step S46, the client 330 transmits a lock acknowledgement message to the server 310. The lock acknowledgement message records the information including the indication of the locked PnP device and its corresponding assigned disk ID.

Figure 4:
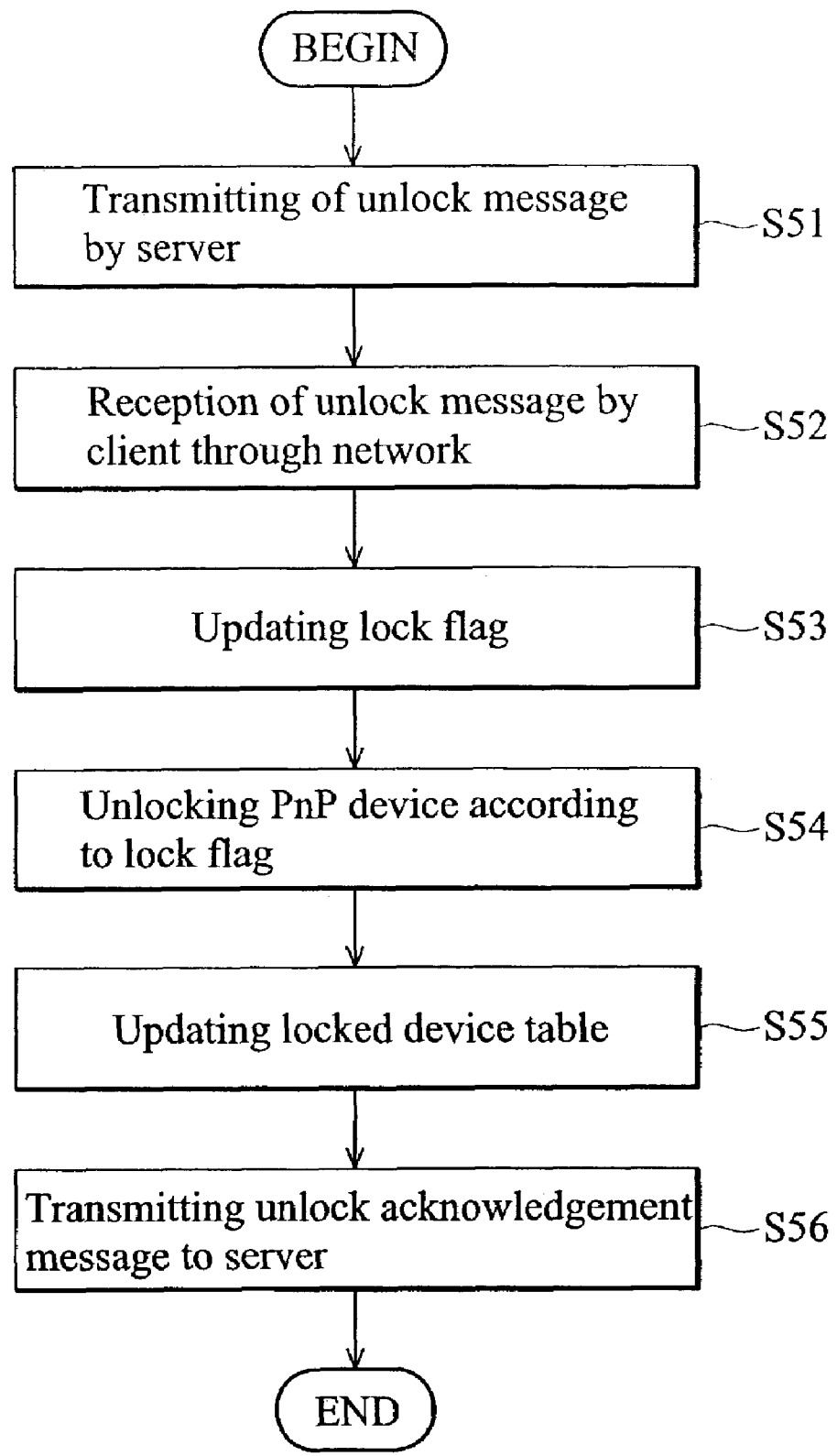
FIG. 4 is a flowchart showing the unlock process of at least one PnP device coupled to a network client according to one embodiment of the present invention.

FIG. 4 shows the unlock process of at least one PnP device coupled to a network client according to one embodiment of the present invention.

First, in step S51, the server 310 transmits an unlock message. Similarly, the unlock message may include a client ID and an indication of which PnP devices is to be unlocked, such that the designated client and the PnP device to be unlocked can be recognized. Note that all PnP devices on the designated client are unlocked if the unlock message only includes the client ID.

Then, in step S52, the client 330 receives the unlock message from the server 310 through the network system 320. Thereafter, in step S53, the client 330 updates the state of the lock flag 333 as "Unlock" by the monitor program 332. Afterward, in step S54, the client 330 unlocks the PnP device 340 by the monitor program 332 via the disk I/O API 334 according to the received unlock message, and in step S55, the monitor program 332 updates the locked device table, that is, to remove the item of the unlocked PnP device 340 from the locked device table. Finally, in step S56, the client 330 transmits an unlock acknowledgement message to the server 310. The unlock acknowledgement message records the information including the indication of the unlocked PnP device and its corresponding assigned disk ID.

Figure 5:
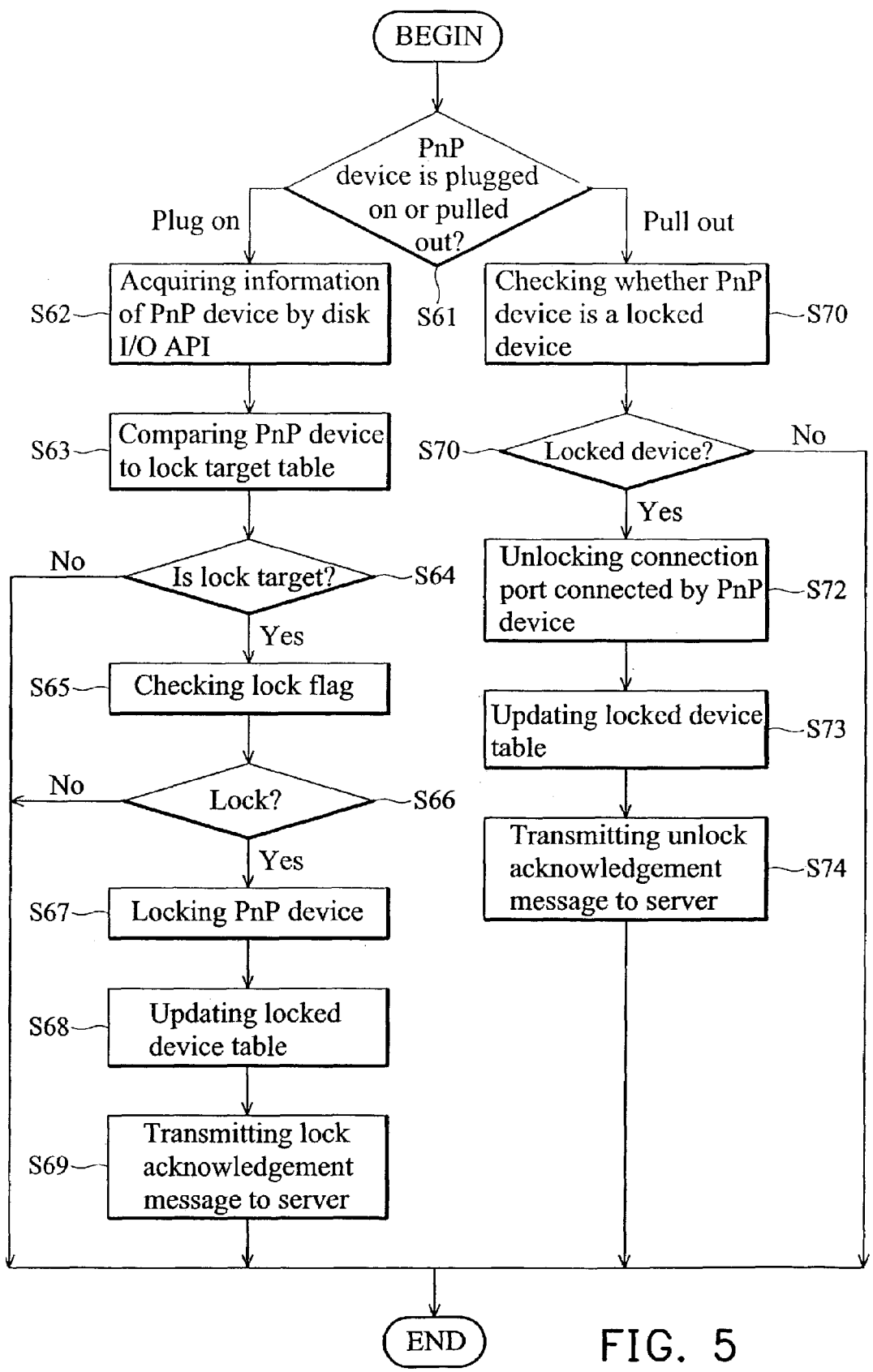
FIG. 5 is a flowchart showing the lock process when a PnP device is installed or removed from the client according to one embodiment of the present invention.

After the server 310 transmits the lock or unlock message to the client 330, the lock/unlock of the PnP device has to comply with the command dispatched by the server 310 if the PnP device is removed from the network client or a new PnP device is installed on the network client. FIG. 5 shows the lock process when the PnP device is installed on or removed from a network client according to the present invention.

First, in step S61, it is checked whether a PnP device is installed or removed from the network client 330. It should be noted that this information is acquired by the PnP API 335. If a new PnP device is installed on the network client 330, in step S62, the information, such as the type of the PnP device 340 is acquired from the operating system 336 by the disk I/O API 334.

Then, in step S63, the plugged PnP device is compared to the lock target table in the monitor program 332 to determine whether the plugged PnP device is to be protected. If not, (as indicated by "No" in step S64), the plugged PnP device is not needed to be protected, and the process is finished. If the PnP device matches with one of the lock targets in the lock target table (as indicated by "Yes" in step S64), in step S65, the monitor program 332 checks the state of the lock flag 333.

If the state of the lock flag is "Unlock" (as indicated by "No" in step S66), it represents the PnP device on the network client 330 does not need to lock, and the process is finished. If the state of the lock flag is "Lock" (as indicated by "Yes" in step S66), in step S67, the network client 330 locks the PnP device by the monitor program 332 via the disk I/O API 334, and in step S68, the monitor program 332 updates the locked device table, that is, to add the PnP device to the locked device table. Finally, in step S69, the client 330 transmits a lock acknowledgement message to the server 310.

In addition, if the PnP device 340 is removed from the network client 330, in step S70, the PnP device 340 is compared to the locked device table in the monitor program 332 to check whether it is a locked device. If not (as indicated by "No" in step S71), the process is finished. If the PnP device 340 is a locked device (as indicated by "Yes" in step S71), in step S72, the monitor program 332 unlocks a connection port used to connect to the PnP device 340 via the disk I/O API 334, and in step S73, the monitor program 332 updates the locked device table, that is, to remove the item of PnP device 340 from the locked device table. Finally, in step S74, the network client 330 transmits an unlock acknowledgement message to the server 310.

Further, if the network client 330 is rebooted, the client 330 checks the lock flag by the monitor program 332, and re-locks the PnP device 340 by the monitor program 332 via the disk I/O API 334 according to the lock flag.

It should be noted that the present invention has several aspects according to different remote control agents 331. For example, the server may transmit a lock program and an unlock program corresponding to the lock process and unlock process respectively to the network client, and execute these programs on the network client to perform related operations. When the lock program runs on the client, the lock program updates the lock flag and instructs the monitor program to perform the lock process of the PnP device via the disk I/O API. Similarly, when the unlock program runs on the client, the unlock program updates the lock flag and instructs the monitor program to perform the unlock process of the PnP device via the disk I/O API.

As a result, by using the security system and method for PnP devices coupled to network clients according to the present invention, the PnP device can be locked and unlocked through a network system. Further, security issues between the computer and PnP devices can be solved, and the computer information is protected from unauthorized access.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A security system for a plug-and-play device for use in a client/server architecture, comprising:
    a server to send a lock message and an unlock message;
    a network system; and
    at least one network client coupled to the server via the network system and having a monitor program for receiving the lock message and the unlock message through the network system, locking a connection port of the network client used to connect to a plug-and-play device, thereby locking the plug-and-play device if the lock message is received, unlocking the connection port connected to the plug-and-play device if the unlock message is received, checking whether the plug-and-play device matches a locked device if the plug-and-play device is removed from the client, unlocking the connection port if the plug-and-play device is removed from the client and is checked as locked,
    wherein the network client further includes a lock flag, and the monitor program further updates a state of the lock flag when the lock message is received by the network client, and checks the state of the lock flag and locks the plug-and-play device according to the lock flag when the network client is rebooted.

2. The security system for a plug-and-play device as claimed in claim 1 wherein the monitor program in the client is distributed by a remote control agent installed on the server.

3. The security system for a plug-and-play device as claimed in claim 1 wherein the monitor program further checks whether a new plug-and-play device matches a lock target when the new plug-and-play device is installed on the network client, and locks the new plug-and-play device if the new plug-and-play device matches a lock target.

4. The security system for a plug-and-play device as claimed in claim 3 wherein the monitor program further checks the lock flag when the new plug-and-play device is installed on the network client, and locks the new plug-and-play device according to the lock flag.

5. The security system for a plug-and-play device as claimed in claim 1 wherein the monitor program locks the plug-and-play device via a disk I/O application programming interface.

6. The security system for a plug-and-play device as claimed in claim 1 wherein the client further transmits a lock acknowledgement message to the server through the network system.

7. The security system for a plug-and-play device as claimed in claim 1 wherein the monitor program unlocks the plug-and-play device via a disk I/O application programming interface.

8. The security system for a plug-and-play device as claimed in claim 7 wherein the client further transmits an unlock acknowledgement message to the server through the network.

9. The security system for a plug-and-play device as claimed in claim 1 wherein the plug-and-play device is a floppy disk, a USB handy drive, an IEEE 1394 hard disk, a USB hard disk, a COM port hard disk, or a CD-RW.

10. A security method for at least one plug-and-play device coupled to a network client in a client/server architecture, comprising the steps of:
    transmitting a lock message and an unlock message by a server;
    receiving the lock message and the unlock message by at least one network client through a network system;
    locking a connection port of the network client used to connect to a plug-and-play device by a monitor program distributed on the network client if the lock message is received thereby locking the plug-and-play device;
    unlocking the connection port connected to the plug-and-play device if the unlock message is received, thereby unlocking the plug-and-play device;
    updating a lock flag by the monitor program when the lock message is received by the network client;
    checking whether the plug-and-play device matches a locked device if the plug-and-play device is removed from the client;
    unlocking the connection port if the plug-and-play device is removed from the client and is checked as locked; and
    checking the lock flag and locking the plug-and-play device by the monitor program according to the lock flag when the client is rebooted.

11. The security method for at least one plug-and-play device coupled to a network client as claimed in claim 10 wherein the monitor program in the client is distributed by a remote control agent of the server.

12. The security method for at least one plug-and-play device coupled to a network client as claimed in claim 10 wherein the monitor program locks the plug-and-play device via a disk I/O application programming interface.

13. The security method for at least one plug-and-play device coupled to a network client as claimed in claim 10 further checking whether a new plug-and-play device matches a lock target by the monitor program when the new plug-and-play device is installed on the client, and locking the new plug-and-play device if the new plug-and-play device matches a lock target.

14. The security method for at least one plug-and-play device coupled to a network client as claimed in claim 13 further checking a value of the lock flag by the monitor program when the new plug-and-play device is installed on the client, and locking the new plug-and-play device according to the lock flag.

15. The security method for at least one plug-and-play device coupled to a network client as claimed in claim 10 further transmitting a lock acknowledgement message by the client to the server through the network system.

16. The security method for at least one plug-and-play device coupled to a network client as claimed in claim 10 wherein the monitor program unlocks the plug-and-play device via a disk I/O application programming interface.

17. The security method for at least one plug-and-play device coupled to a network client as claimed in claim 10 further transmitting an unlock acknowledgement message by the client to the server through the network system.

* * * * *